United States Patent
Olive et al.

(10) Patent No.: US 10,408,076 B2
(45) Date of Patent: Sep. 10, 2019

(54) TURBINE BLADE HAVING AN END CAP

(71) Applicant: Safran Aircraft Engines, Paris (FR)

(72) Inventors: Remi Philippe Oswald Olive, Moissy-Cramayel (FR); Cis Guy Monique De Maesschalck, Kortrijk (BE); Sergio Lavagnoli, Brussels (BE); Guillermo Paniagua, Nossegem (BE)

(73) Assignee: SAFRAN AIRCRAFT ENGINES, Paris (FR)

( * ) Notice: Subject to any disclaimer, the term of this patent is extended or adjusted under 35 U.S.C. 154(b) by 371 days.

(21) Appl. No.: 15/524,246

(22) PCT Filed: Nov. 3, 2015

(86) PCT No.: PCT/FR2015/052954
§ 371 (c)(1),
(2) Date: May 3, 2017

(87) PCT Pub. No.: WO2016/071620
PCT Pub. Date: May 12, 2016

(65) Prior Publication Data
US 2017/0328229 A1    Nov. 16, 2017

(30) Foreign Application Priority Data
Nov. 4, 2014    (FR) ...................... 14 60618

(51) Int. Cl.
*B63H 1/26* (2006.01)
*F01D 11/08* (2006.01)
(Continued)

(52) U.S. Cl.
CPC ............... *F01D 11/08* (2013.01); *F01D 5/18* (2013.01); *F01D 5/20* (2013.01);
(Continued)

(58) Field of Classification Search
CPC ... F01D 5/20; F01D 5/14; F01D 5/141; F01D 5/147; F01D 5/18; F01D 11/08;
(Continued)

(56) References Cited

U.S. PATENT DOCUMENTS

| 5,733,102 A | * | 3/1998 | Lee ..................... F01D 5/187 |
| | | | 415/115 |
| 8,672,629 B2 | * | 3/2014 | Botrel ................. F01D 5/20 |
| | | | 416/92 |

(Continued)

FOREIGN PATENT DOCUMENTS

| DE | 19944923 | 3/2001 |
| FR | 2928405 | 9/2009 |
| JP | 62223402 | 10/1987 |
| JP | 06264703 | 9/1994 |

OTHER PUBLICATIONS

Snecma, "French Preliminary Search Report," FR Application No. 1460618 (dated Jul. 3, 2015) (with English translation cover sheet).

(Continued)

*Primary Examiner* — Long T Tran
*Assistant Examiner* — James J Kim
(74) *Attorney, Agent, or Firm* — Womble Bond Dickinson (US) LLP (57) ABSTRACT

The invention relates to a turbine blade (1) of a turbine engine including an upper surface (11), a lower surface (12), a leading edge (13), a trailing edge (14), and a squealer tip (2) at the top thereof, wherein said squealer tip (2) is defined by a rim (2a) and comprises at least one inner rib (3) that is spaced apart from the rim (2a) defining the squealer tip (2). The invention is characterized in that said inner rib (3) is shaped to define, inside the squealer tip, a cavity (4) inside of which the passage of leak flows (5) is limited, wherein an upstream opening (131) is made in the rim (2a) at the (Continued)

leading edge (13), and a downstream opening (141) is made in the rim (2*a*) at the trailing edge (14).

10 Claims, 9 Drawing Sheets

(51) Int. Cl.
*F01D 5/20* (2006.01)
*F01D 5/18* (2006.01)
(52) U.S. Cl.
CPC .. *F05D 2240/303* (2013.01); *F05D 2240/307* (2013.01); *Y02T 50/673* (2013.01)
(58) Field of Classification Search
CPC ........... F05D 2240/307; F05D 2220/32; Y02T 50/673; Y02T 50/676
USPC ................................ 416/228, 96 R, 97 R, 91
See application file for complete search history.

(56) References Cited

U.S. PATENT DOCUMENTS

| | | | |
|---|---|---|---|
| 10,041,358 B2* | 8/2018 | Propheter-Hinckley | .................... F01D 5/187 |
| 2008/0118363 A1* | 5/2008 | Lee | ......................... F01D 5/187 416/232 |
| 2010/0303625 A1* | 12/2010 | Kuhne | ..................... F01D 5/20 416/91 |
| 2014/0044557 A1* | 2/2014 | Giglio | ...................... F01D 5/20 416/97 R |

OTHER PUBLICATIONS

Snecma, "International Search Report," PCT Application No. PCT/FR2015/052954 (dated Jan. 19, 2016) (with English translation cover sheet).

\* cited by examiner

TURBINE BLADE HAVING AN END CAP

The present invention relates to turbine engine turbine blades.

It finds advantageous application in particular in the case of high-pressure turbines at the outlet of the combustion chamber of a turbojet engine.

GENERAL TECHNICAL FIELD AND PRIOR ART

Conventionally, clearance at the tip of the blades is provided between the blades of a turbine of a turbine engine and the inner face of the ring in which said rotor turns, which allows rotation of said rotor. Due to the movement of the rotor and the difference in pressure between the lower surface and the upper surface of the blades, leakage flows occur at the clearance between the tip of each of the blades and the inner face of the ring. These flows, and the vortices that they create at the upper surface, are the source of numerous aerodynamic and aerothermal problems which directly affect the performance of the turbine engine.

The clearance between the tip of the blades and the inner surface of the ring is generally adjusted so as to reduce these flows. Nevertheless, reduction of this clearance increases the risk of contact between the blades and the inner surface of the ring and strongly limits the lifetime of the blades; in addition, it also causes an increase in the temperatures of the tip of the blades, which also has an impact on the lifetime of the blades.

To compensate for this disadvantage, it is known conventionally to provide a squealer tip at the top of the blades, which makes it possible to limit the contact surface between the blade and the ring. These squealer tips are generally defined by a rim which delimits a closed contour and which for this purpose, extends at the blade tip, along the upper surface and the lower surface, from the leading edge to the trailing edge.

In particular, squealer tip configurations intended to optimize the aerodynamic and aerothermal performances of the blades have been proposed.

Known for example is patent application WO2009/115728 by the applicant, which proposes an example of a configuration of a blade tip comprising a squealer tip at its top. The squealer tip comprises a cavity in which is positioned a wall forming a deflector, said wall not being connected to the rim defining the squealer tip.

However, solutions known in the prior art to this day prove insufficient, particularly with regard to the performance required of new generation turbojet engines.

GENERAL PRESENTATION OF THE INVENTION

A general goal of the invention is to increase the aerodynamic and aerothermal performance of turbine blades.

In particular, the invention proposes a squealer tip structure at the top of the blades which allows an increase in the efficiency of the turbine.

It will be noted here that in the case of turbojet engines, an increase in the efficiency of the turbines reflects directly on the efficiency and the specific fuel consumption of the turbojet itself. That is the reason for which the proposed solution finds advantageous application in the case of high-pressure turbine blades of a turbojet engine.

In particular, according to one aspect, the invention consists of a turbine blade of a turbine engine comprising an upper surface, a lower surface, a leading edge and a trailing edge, as well as a squealer tip at its top, said squealer tip being defined by a rim and comprises an inner rib which is spaced from the rim defining said squealer tip, characterized in that said inner rib is formed to delimit inside the squealer tip a cavity, inside which the transit of leakage flows is limited, an upstream opening being made in the rim at the leading edge, and a downstream opening being made in the rim at the trailing edge.

According to another aspect, the inner rib comprises an upper surface, a lower surface, a leading edge and a trailing edge, the lower surface of the inner rib being spaced in a substantially constant manner from the upper surface of the blade.

According to an additional aspect, the inner rib comprises an upstream extension at its leading edge.

According to an additional aspect, the inner rib comprises a downstream extension at its trailing edge.

According to an additional aspect, the upstream opening is made in the rim on the lower surface and in a portion of the end of the leading edge on the upper surface.

According to another aspect, the downstream opening is made in the rim only on the lower surface.

According to an additional aspect, the squealer tip comprises a bottom, and the cavity is formed by a portion of the bottom of the squealer tip which is surrounded by the inner rib.

DESCRIPTION OF THE FIGURES

Other features, aims and advantage of the present invention will appear upon reading the detailed description which follows, and with reference to the appended drawings, given by way of non-limiting examples and wherein.

DESCRIPTION OF ONE OR MORE DETAILED EMBODIMENTS

Figure 1:
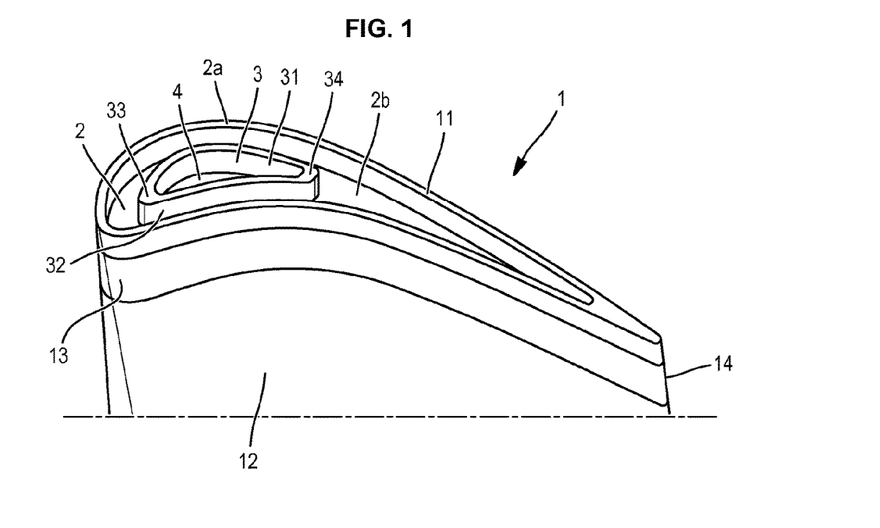
FIG. 1 shows a perspective view of a tip of a blade of an impeller on which a squealer tip according to a first embodiment of the invention has been constructed.
Figure 2:
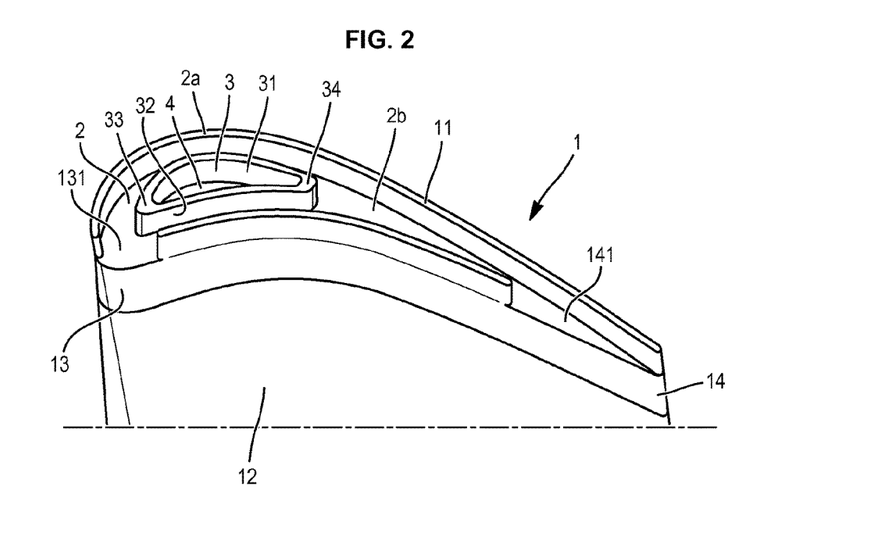
FIG. 2 shows a perspective view of a tip of a blade of an impeller on which a squealer tip according to a second embodiment of the invention has been constructed.
Figure 3:
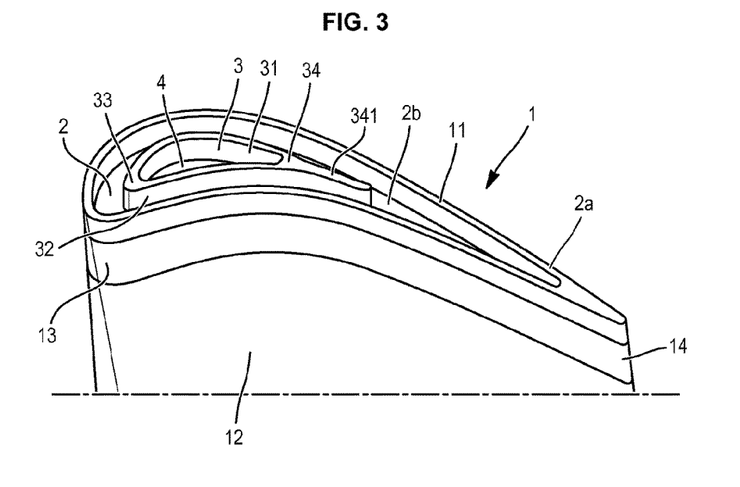
FIG. 3 shows a perspective view of a tip of a blade of an impeller on which a squealer tip according to a third embodiment of the invention has been constructed.

A blade 1 of a high-pressure turbine of a turbojet engine is shown in FIG. 1 and the following. In the turbojet engine, the turbine comprises a disk on which is mounted circumferentially a plurality of blades 1. This disk and the blades are placed inside a ring located downstream of a combustion chamber. The turbine blades and the ring are dimensioned so that the clearance between the ring and the blades is limited.

Such a blade 1 has an aerodynamic profile and has a convex upper surface 11 and a concave lower surface 12 which both extend between on the one hand a rounded upstream edge which forms a leading edge 13 and on the other hand a trailing edge 14.

At its tip, intended to be facing the inner face of the ring, the blade 1 has a squealer tip 2 defined by a rim 2a which borders a bottom 2b of said squealer tip by extending along the upper surface 11 and the lower surface 12, from the leading edge 13 to the trailing edge 14. According to a variant, the rim 2a of the squealer tip 2 comprises at least one portion over which it does not extend along the upper surface 11, the lower surface 12, the leading edge 13 or the trailing edge 14, but separates from it, for example by entering toward the interior of the tip of the blade 1. In fact, the rim 2a consists of a rib at the tip of the blade 1 which follows the contour of the blade 1, and which can be a part of said contour of the blade 1, or be remote from it.

Figure 9:
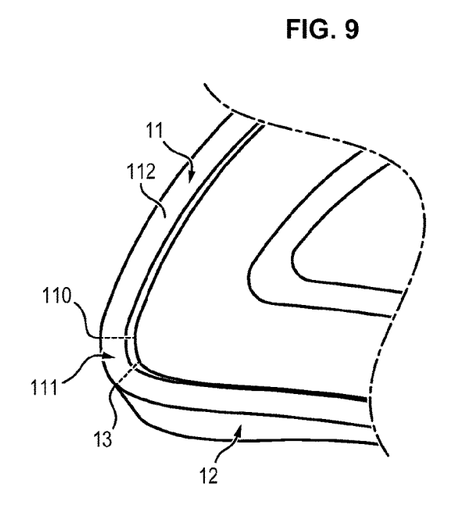
FIG. 9 shows a top view of the blade according to the first embodiment which details the structure of the upper surface.

The upper surface 11 comprises an elbow 110 which is located in proximity to the leading edge 13 of the blade 1. The upper surface 11 comprises two portions which are separated by the elbow 110:
an end portion of the leading edge 111 which is situated between the leading edge 13 and the elbow 110;
a central portion 112 which is situated after the elbow 110, and which is separated from the leading edge 13 by the end leading edge portion 111.

An inner rib 3 is positioned inside said squealer tip 2, said inner rib 3 having the same height as the rim 2a.

Figure 5:
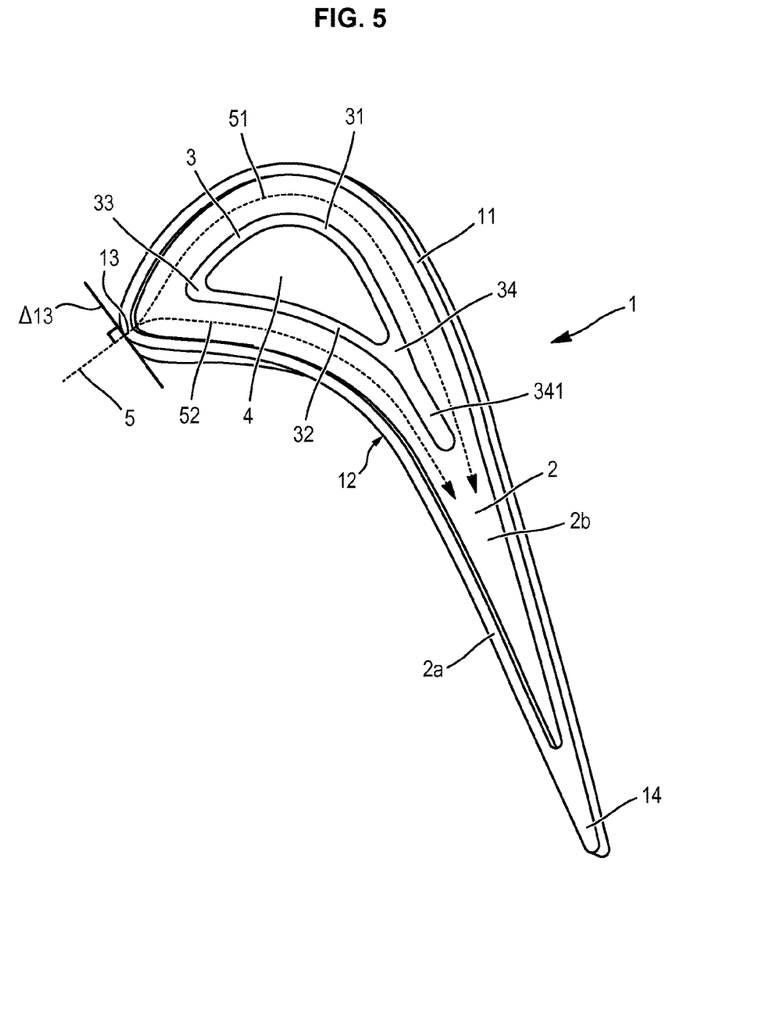
FIG. 5 shows a top view of the blade according to the third embodiment of the invention.

This inner rib 3, as shown in FIG. 5 and the following, is closed over itself and thus forms a cavity 4 inside the squealer tip 2, so as to limit the transit of the leakage flows 5 within said cavity 4. However, according to a possible variant, the inner rib 3 can comprise at least one hole in its wall. The fact of limiting the transit of the major portion of the leakage flows 5 inside the cavity 4 makes it possible to improve the aerothermal properties of the blade 1 while limiting the heating of the cavity 4 by the leakage flows 5. The fact of limiting the heating of the cavity 4 makes it possible to create a relatively cold zone at the tip of the blade 1 which serves to cool the entire tip of the blade, and thus to increase the blade's lifetime. More precisely, only the most energetic portion of the leakage flows 5 is not stopped by the inner rib 3 and runs into the cavity 4.

The cavity 4 does not communicate with the blade cooling circuit; it is in fact a portion of the bottom 2b of the squealer tip 2 which is surrounded by the inner rib 3. Thus, the squealer tip 2 only comprises a single bottom 2b which is flat, a portion of this bottom 2b being surrounded by the inner rib 3, thus forming the cavity 4. The bottom of the cavity 4 is therefore located at the same height on the blade 1 as the rest of the bottom 2b of the squealer tip 2 which is not surrounded by the inner rib 3.

Figure 12:
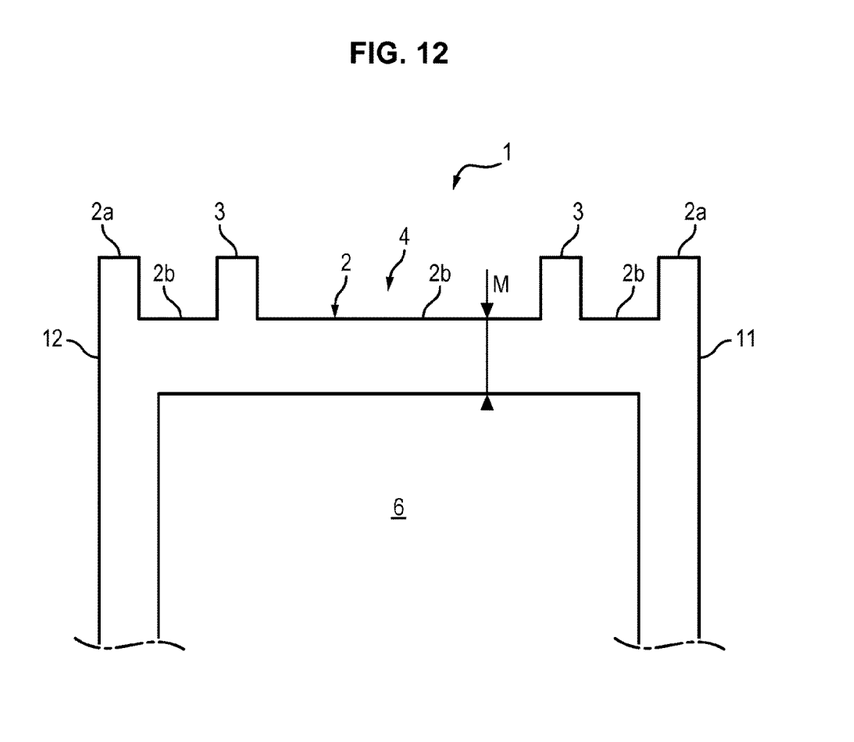
FIG. 12 shows a section view of a blade according to one embodiment.

As represented in FIG. 12, the blade 1 comprises an internal cooling circuit 6 which is formed by a cavity located inside the blade below the squealer tip 2, a flow of air which is colder than the leakage flows 5 circulating inside said cavity. This internal cooling circuit serves to cool the squealer tip 2. The squealer tip 2 is separate from the internal cooling circuit 6 by a thickness of material M. As illustrated in FIG. 12, the thickness of material M is constant over the entire tip of the blade 1.

In order to cool the tip of the blade as well as possible, the thickness of material M must be as thin as possible. Moreover, so as to reduce the centrifugal force created by the rotation of the blade 1, it is preferable to reduce the mass of said blade 1 at its tip. However, a minimum thickness value of the material M is necessary so that the blade 1 can resist the extreme temperatures and pressures attained during the operation of the turbine engine. Thus, the fact that the cavity 4 is formed of a portion of the bottom 2b of the squealer tip 2 which is surrounded by the inner rib 3 makes it possible to reduce the mass at the tip of the blade 1 and to effectively cool the entire squealer tip 2. In addition, as shown on each of FIGS. 1 to 7, the inner rib 3 has an aerodynamic shape, or to put it another way the inner rib 3 has the shape of a turbine blade, and thus comprises:
a convex upper surface 31 located facing the upper surface 11 of the blade 1;
a concave lower surface 32 located facing the lower surface 12 of the blade 1;
a leading edge 33 located facing the leading edge 13 of the blade 1, which forms the upstream portion of the inner rib 3;
a trailing edge 34 located facing the trailing edge 14 of the blade 1, which forms the downstream portion of the inner rib 3.

Thus the most energetic portion of the leakage flows 5 which runs into the cavity 4 by running over the leading edge 33 and the lower surface 32 of the inner rib 3, presses against the upper surface 31 of the inner rib 3 and thus allows the recovery of a much greater load force.

In the variant according to which the inner rib 3 comprises at least a hole in its wall, this hole must not be located at the leading edge 33 of the inner rib 3, or else the leakage flows 5 can penetrate into the cavity 4 with no obstacle. Thus, preferably but without limitation, the inner rib 3 comprises a hole at its trailing edge 34.

The upper surface 31 of the inner rib 3 is spaced in a constant manner from the upper surface 11 of the blade 1, and the lower surface 32 of the inner rib 3 is also spaced in a constant manner from the lower surface of the blade 1. Thus, the inner rib 3 has a shape similar to that of the rim 2a defining the squealer tip 2, and the cavity 4 has a shape similar to that of the squealer tip 2.

Such an internal rib 3 makes it possible to recover a portion of the load force of the leakage flows 5, which press against said inner rib 3. More precisely, the leakage flows 5 are divided into two distinct flows 51 and 52 at the leading edge 33 of the inner rib 3 (FIGS. 5 to 7), the first flow 51 running between the upper surface 11 of the rib 1 and the upper surface 31 of the inner rib 3, and the second flow 52 running between the lower surface 12 of the blade 1 and the lower surface 32 of the inner rib 3. During their transit, the first flow 51 presses against the rim 2a along the upper surface 11 of the blade 1, and the second flow 52 presses against the lower surface 31 of the inner rib 3, thus allowing recovery of the load force. This recovery of the load force of the leakage flows 5 makes it possible to increase the aerodynamic performance of the blade 1.

As shown in FIG. 5, the leakage flows 5 have a direction which is substantially perpendicular to a tangent $\Delta 13$ to the leading edge 13.

According to a variant embodiment, and as can be seen in FIGS. 3 to 7, the inner rib 3 can comprise an upstream extension 331 located at the leading edge 33 of the inner rib 3, or a downstream extension 341 located at the trailing edge 34 of the inner rib 3. The upstream extension 331 comprises a first end which is connected to the leading edge 33 of the inner rib 3, and a second end which is located facing the leading edge 13 of the blade 1. Similarly, the downstream extension 341 comprises a first end which connected to the trailing edge 34 of the inner rib 3, and a second end which is located facing the trailing edge 14 of the blade 1.

The upstream 331 and downstream 341 extensions are portions of the inner rib 3 which do not participate in delimiting the cavity 4. According to one advantageous variant, the width of the upstream 331 and downstream 341 extensions is substantially equal to the width of the inner rib 3 at the upper surface 31, the lower surface 32, the leading edge 33 and the trailing edge 34. The upstream 331 and downstream 341 extensions successively extend the upstream portion and the downstream portion of the inner rib 3, by bringing them closer to the leading edge 13 and the trailing edge 14 of the blade 1.

When the inner rib 3 comprises an upstream extension 331, the leakage flows 5 are divided into two distinct flows 51 and 52 at the end of the upstream extension 331 which is located facing the leading edge 13 of the blade 1.

The upstream extension 331 and the downstream extension 341 make it possible to increase the surface area of the inner rib 3 over which the second flow 52 presses during its transit in the squealer tip 2.

According to an additional embodiment, the inner rib 3 can comprise an upstream extension 331 and a downstream extension 341 simultaneously. The upstream 331 or downstream 341 extensions therefore make it possible to improve the aerodynamic performance of the blade 1 by recovering a greater load force.

According to another variant embodiment, and as can be seen in FIGS. 2, 4, 6 and 7, the rim 2a of the tip of the blade 1 which delimits the squealer tip 2 comprises an upstream opening 131 located at the leading edge 13, as well as a downstream opening 141 located at the trailing edge 14. The embodiment thus presented comprises an upstream opening 131 and a downstream opening 141, but according to an additional variant, the rim 2a can comprise only an upstream opening 131 with no downstream opening 141, or only a downstream opening 141 with no upstream opening 131.

The upstream opening 131 makes it possible on the one hand to limit the mass of the blade 1 at its tip, which important considering the rotation speed of the blade 1, and on the other hand to increase in a controlled manner the quantity of the leakage flows 5 entering the squealer tip so as to increase the recovery of load forces by the blade 1. Preferably, the upstream opening 131 is made mainly in the portion of the rim 2a located on the lower surface 11 of the blade 1. More precisely, the upstream opening 131 is made on the rim 2a located on the end portion of the leading edge 111 of the upper surface 11.

Such an upstream opening 131 makes it possible to channel the leakage flows 5 entering through said upstream opening 131 both in the cavity between the lower surface 12 of the blade 1 and the lower surface 32 of the inner rib 3, and in the cavity between the upper surface 11 of the blade 1 and the upper surface 31 of the inner rib 3. With such an upstream opening 131, the leakage flows 5 entering through said upstream opening 131 are principally channeled into the cavity between the lower surface 12 of the blade 1 and the lower surface 32 of the inner rib 3. Thus, such an upstream opening 131 makes it possible to increase the recovery of the load forces by increasing the flow rate of the second flow 52, so that the leakage flows 5 press more heavily on the lower surface 32 of the rib 3, and by also increasing the flow rate of the first flow 51 so that the leakage flows 5 press more heavily on the upper surface 11 of the blade 1.

It is preferable that the upstream opening 131 is made in the rim 2a on the lower surface 12 of the blade 1 and on the end portion of the leading edge 111 because, considering the angle of incidence of the leakage flows 5 with respect to the leading edge 13 of the blade 1:

an upstream opening 131 made only in the rim 2a on the end portion of the leading edge 111 of the upper surface 11 of the blade 1 would only allow leakage flows 5 to be channeled into the cavity between the upper surface 11 of the blade 1 and the upper surface 31 of the inner rib 3;

an upstream opening made only in the rim 2a on the lower surface 12 would allow leakage flows 5 to be channeled only into the cavity between the lower surface 12 of the blade 1 and the lower surface 32 of the inner rib 3.

The downstream opening 141 makes it possible, on the one hand, in a similar manner to the upstream opening 131, to limit the mass of the blade 1 at its tip, and on the other hand to facilitate the discharge of leakage flows 5 by the trailing edge 14. Proper discharging of the leakage flows 5 thus makes it possible to limit the heating of the squealer tip 2 due to the stagnation of the leakage flows 5 in the squealer tip 2. Preferably, the downstream opening 141 is made only in the rim 2a on the upper surface 11 or on the lower surface 12 of the blade 1. In a possible preferred embodiment, the downstream opening 141 is made in the rim 2a on the lower surface 12 of the blade 1. Such an opening makes it possible to discharge the leakage flows 5 optimally and allows maintaining an acceptable clearance between the tip of the blade 1 and the inner face of the ring in which the blade 1 is set in rotation.

Figure 4:
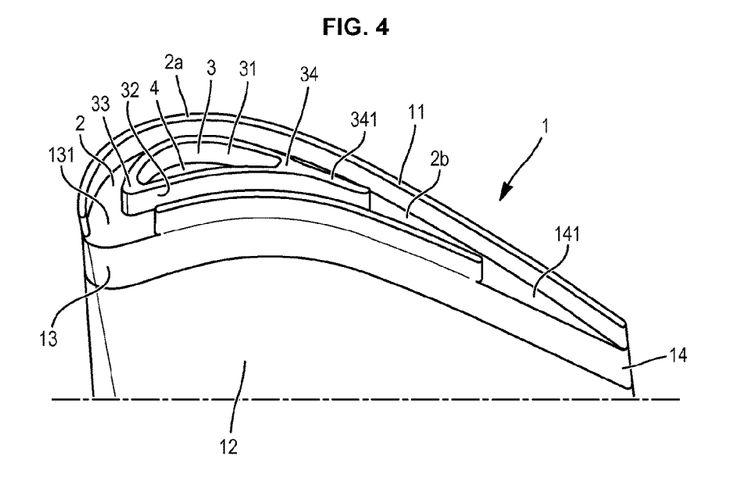
FIG. 4 shows a perspective view of a tip of a blade of an impeller on which a squealer tip according to a fourth embodiment of the invention has been constructed.
Figure 6:
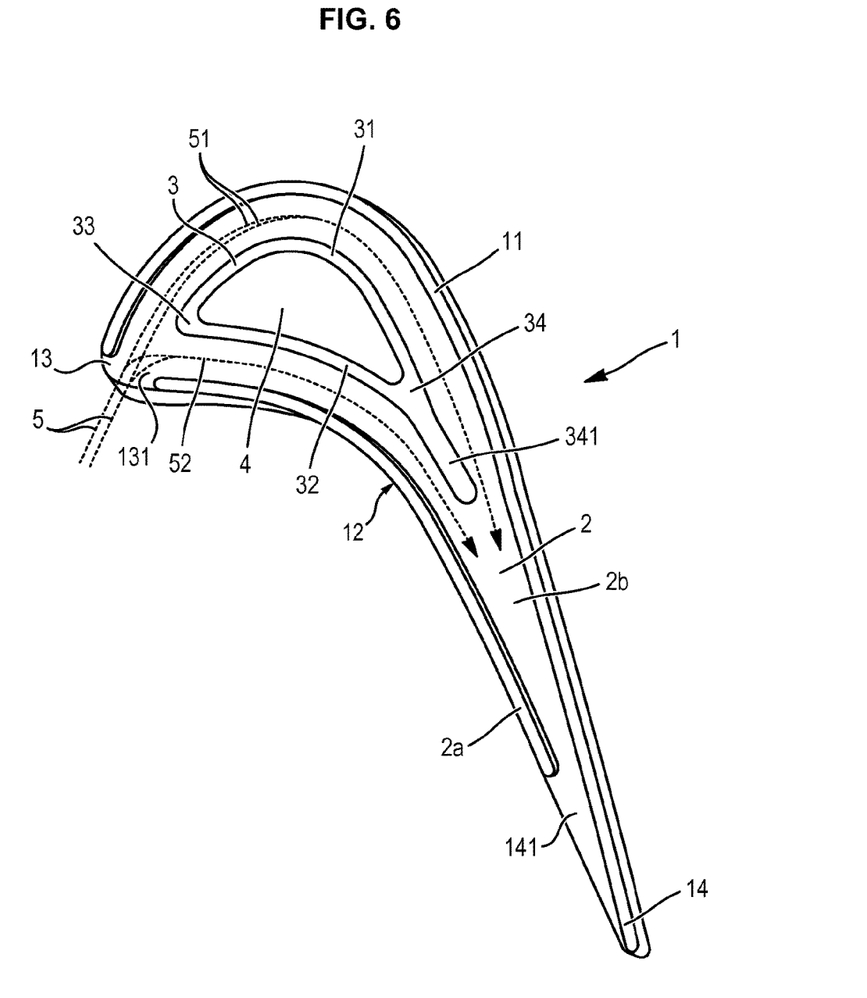
FIG. 6 shows a top view of the blade according to the fourth embodiment of the invention.
Figure 7:
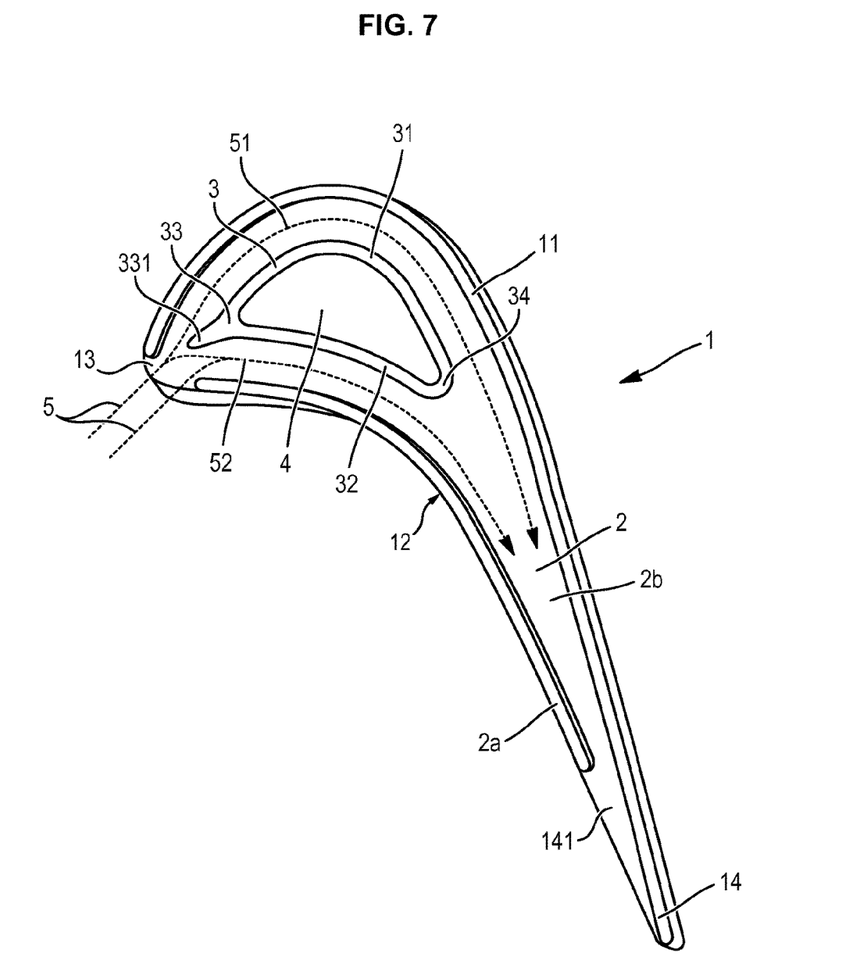
FIG. 7 shows a top view of the blade according to a fifth embodiment of the invention.
Figure 8:
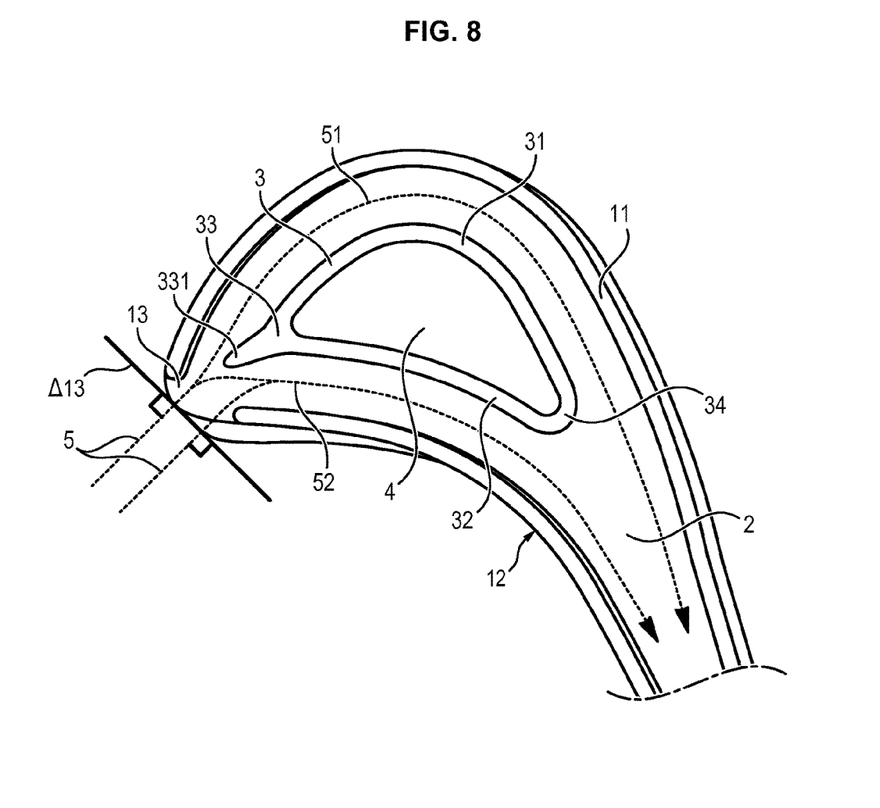
FIG. 8 shows a top view of the blade according to the fifth embodiment of the invention which specifies the direction of flow of the leakage flows with respect to the leading edge of the blade.

According to an additional variant, and as can be seen in FIGS. 4, 6 and 7, the inner rib 3 comprises an upstream extension 331 or a downstream extension 341, and the rim 2a which defines the squealer tip 2 comprises an upstream opening 131 or a downstream opening 141. Of course it is possible that the inner rib 3 comprises an upstream extension 331 and a downstream extension 341, and that the rim 2a comprises an upstream opening 131 and a downstream opening 141. The variant according to which the rim 2a comprises an upstream opening 131 and a downstream opening 141 is an advantageous compromise between aerodynamic and aerothermal performance of the blade 1, because this allows on the one hand a greater limitation of the mass of the blade 1, and on the other hand better circulation of the leakage flows 5 inside the squealer tip 2 so as to recover more load force while still limiting heating of the tip of the blade 1.

Figure 10:
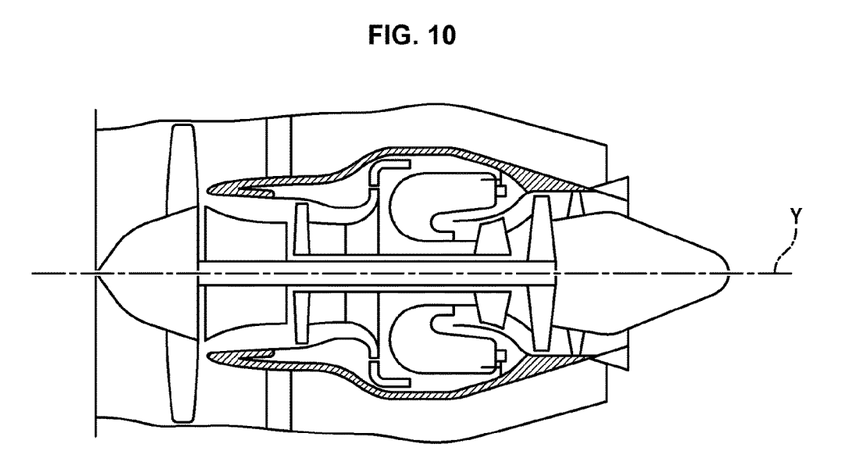
FIG. 10 shows a view of a turbine on which is shown the axis of said turbine.

Advantageously, the distance between the leading edge 13 of the blade 1 and the leading edge 33 of the inner rib 3 is comprised between 1% and 25% of the axial chord of the blade. The axial chord is the projection of the chord of the blade 1 on the Y axis of the turbine, the Y axis of the turbine being illustrated in FIG. 10. In the case where the inner rib 3 comprises an upstream extension 331, the distance between the leading edge 13 of the blade 1 and the end of the upstream extension 331 is comprised between 1% and 25% of the axial chord of the blade.

Moreover, preferentially, the distance between the trailing edge 14 of the blade 1 and the trailing edge 34 of the inner rib 3 is comprised between 1% and 25% of the axial chord of the blade. In the case where the inner rib 3 comprises a downstream extension 341, the distance between the trailing edge 14 of the blade 1 and the end of the downstream extension 341 is comprised between 1% and 25% of the axial chord of the blade.

Figure 11:
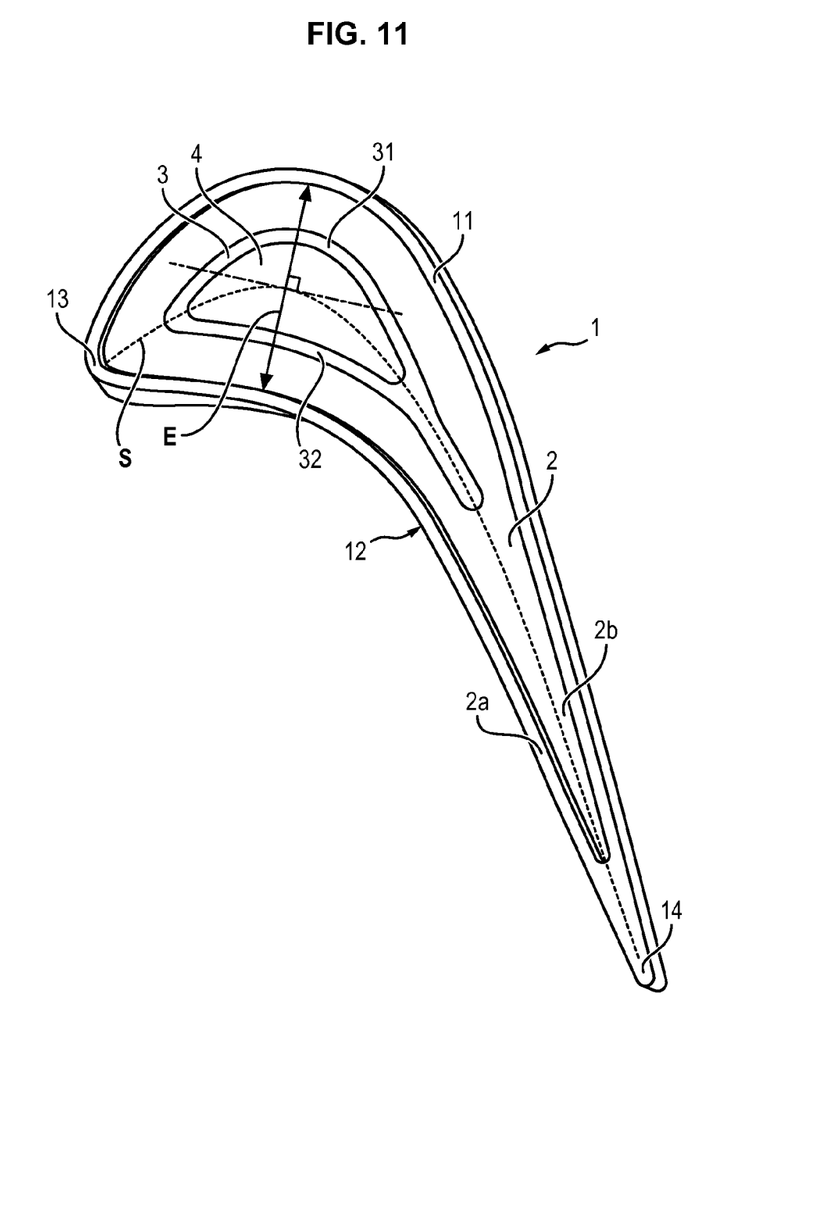
FIG. 11 shows a top view of a blade on which is shown a mean line of said blade.

According to an advantageous variant, the space between the upper surface 11 of the blade 1 and the upper surface 31 of the inner rib 3 is comprised between 1% and 30% of the maximum thickness E of the blade, and preferably between 15% and 30%. Such spacing makes it possible to ensure that a maximum portion of the leakage flows 5 which penetrate into the squealer tip remains between the upper surface 11 of the blade 1 and the upper surface 31 of the inner rib 3. The maximum thickness E of the rib is the maximum distance between the lower surface 12 and the upper surface 11 of the blade 1, said maximum distance E being measured orthogonally to the mean line S of the blade as illustrated in FIG. 11. The mean line S consists of all the points equidistant from the lower surface 12 and the upper surface 11 of the blade 1.

According to a preferred variant, the space between the lower surface 12 of the blade 1 and the lower surface 32 of the inner rib 3 is comprised between 1% and 30% of the maximum thickness E of the blade, and preferably between 15% and 30%. Such spacing makes it possible to ensure that a maximum portion of the leakage flows 5 which penetrate into the squealer tip remains between the lower surface 12 of the blade 1 and the lower surface 32 of the inner rib 3.

According to an advantageous variant, the surface of the cavity 4 is comprised between 15% and 40% of the total surface area of the squealer tip 2, preferably between 20% and 30% of the total surface area of the squealer tip 2, and even more preferably 25% of the total surface area of the squealer tip 2. This feature makes it possible to ensure good circulation of the leakage flows 5 inside the squealer tip and to limit the heating of a significant surface area of the squealer tip 2.

The invention claimed is:

1. A turbine blade of a turbine engine comprising an upper surface, a lower surface, a leading edge, a trailing edge, and a squealer tip at its top, said squealer tip being defined by a rim and comprises an inner rib which is spaced from the rim defining said squealer tip, wherein said inner rib is formed to delimit inside the squealer tip a cavity, inside which the transit of leakage flows is limited, the squealer tip comprising a bottom, and that the cavity being formed by a portion of the bottom of the squealer tip which is surrounded by the inner rib.

2. The blade according to claim 1, wherein the inner rib comprises an upper surface, a lower surface, a leading edge and a trailing edge, the leading edge of the inner rib being spaced in a substantially constant manner from the lower surface of the blade, and the upper surface of the inner rib being spaced in a substantially constant manner from the upper surface of the blade.

3. The blade according to claim 2, wherein the inner rib comprises an upstream extension at its leading edge.

4. The blade according to claim 2, wherein the inner rib comprises a downstream extension at its trailing edge.

5. The blade according to claim 1, wherein a downstream opening is made in the rim at the trailing edge.

6. A turbine disk, wherein it comprises blades according to claim 1.

7. A high-pressure turbine of a turbojet engine, wherein it comprises blades according to claim 1.

8. The blade according to claim 1, wherein an upstream opening is made in the rim at the leading edge.

9. The blade according to claim 8, wherein the upstream opening is made in the rim on the lower surface, and on an end portion of the leading edge of the upper surface.

10. The blade according to claim 5, wherein the downstream opening is made in the rim only on the lower surface.

* * * * *